June 16, 1931. W. JOHNSON 1,810,609
STEERING GEAR
Filed May 6, 1930 2 Sheets-Sheet 1
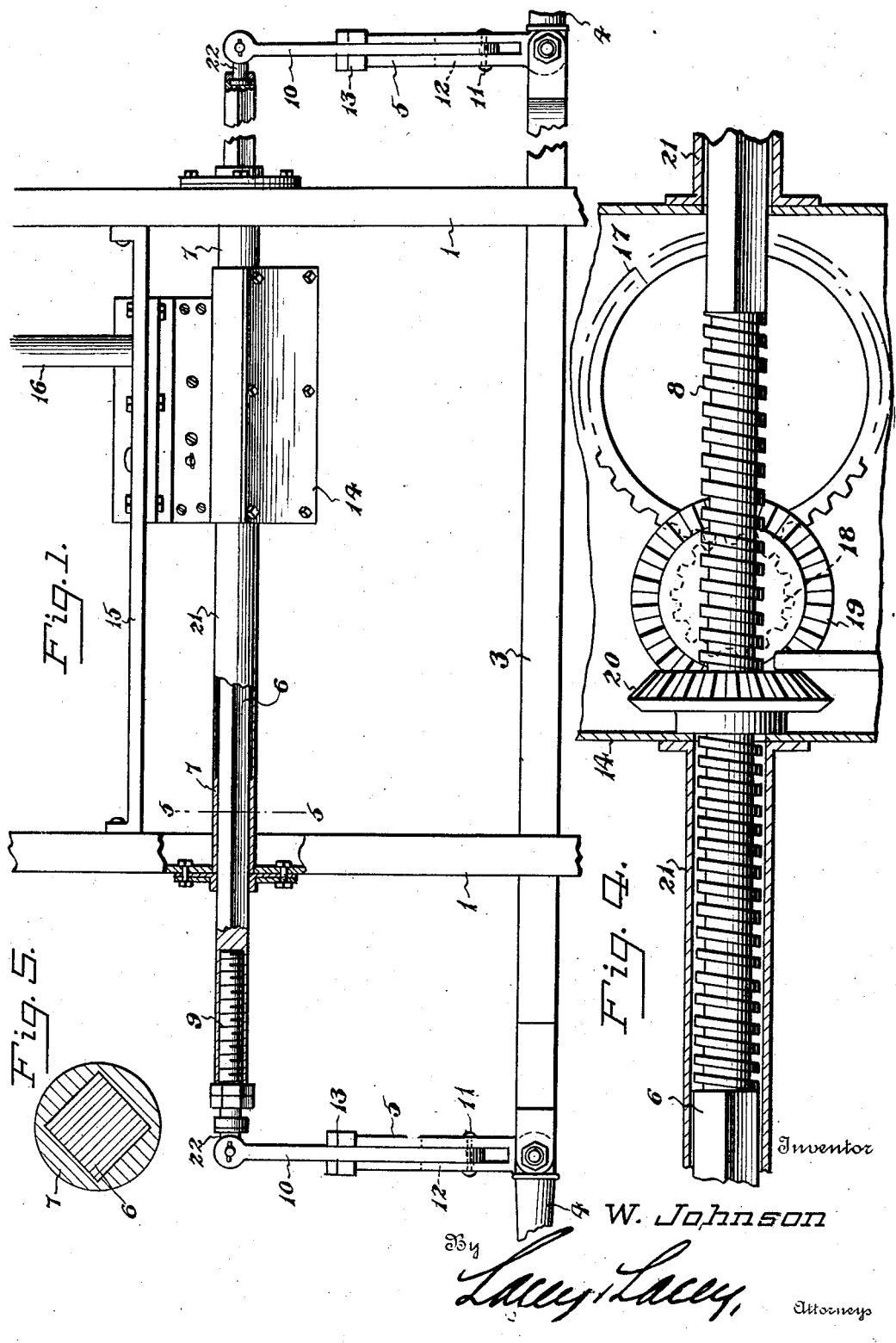
Inventor
W. Johnson
By Lacey & Lacey, Attorneys

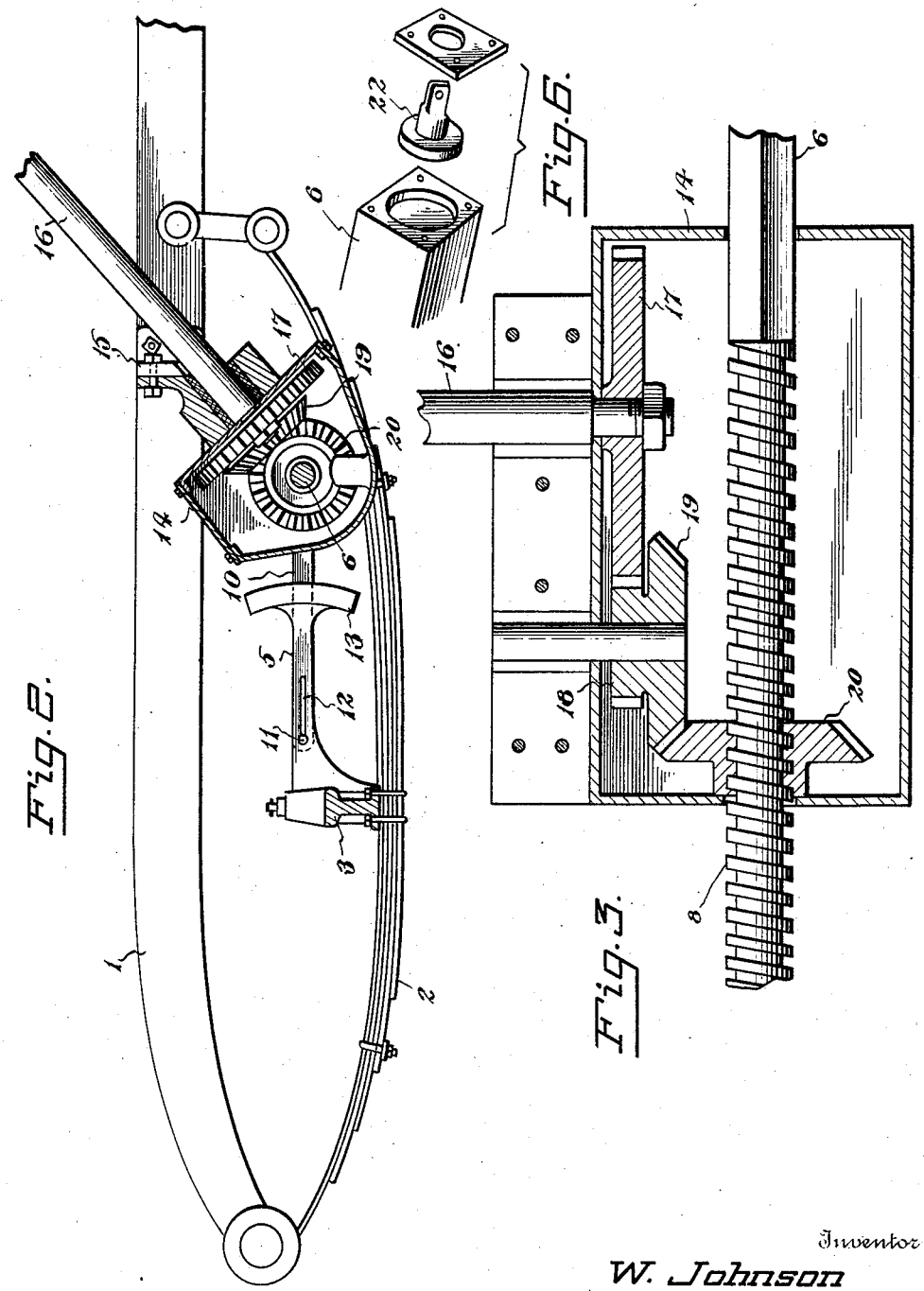

Patented June 16, 1931

1,810,669

UNITED STATES PATENT OFFICE

WALFRID JOHNSON, OF SUMMIT, NEW JERSEY

STEERING GEAR

Application filed May 6, 1930. Serial No. 450,253.

This invention relates to mechanism designed chiefly for the steering of motor vehicles and provides means of the character aforesaid which holds the steering wheels of the vehicle in adjusted position against possible movement, even though one of the wheels should strike an object, or drop into a depression, or otherwise be acted upon in a manner tending to move it from a desired position.

A further purpose of the invention is the provision of a steering mechanism which is simple and positive in action and which prevents the transmission of vibration or shock to the operator.

While the drawings illustrate a preferred embodiment of the invention, it is to be understood that in adapting the means to meet specific needs and requirements the design may be varied and changes in the minor details of construction may be resorted to within the scope of the invention as claimed without departing from the spirit thereof.

For a full understanding of the invention and the merits thereof, reference is to be had to the following description and the drawings hereto attached, in which:

Figure 1 is a fragmentary view of a motor vehicle chassis illustrative of an embodiment of the invention.

Figure 2 is a detail sectional view.

Figure 3 is a detail sectional view of the gearing forming connecting means between the steering shaft and connecting rod.

Figure 4 is a front view of the parts illustrated in Figure 3, the gear housing being in section.

Figure 5 is an enlarged detail sectional view of the connecting rod and bearing, on the line 5—5 of Figure 1.

Figure 6 is a detail perspective view of the parts forming the swivel connection between the drag link and the pivoted arms.

Corresponding and like parts are referred to in the followng description and designated in the several views of the drawings by like reference characters.

The numeral 1 designates the side bars of a motor vehicle chassis, 2 the side springs, and 3 the front axle. These parts may be of any well known construction and are illustrated to demonstrate the application of the invention. The axle arms or wheel spindles 4 are pivoted to the ends of the axle 3 in the usual manner and are provided with rearwardly extending parallel arms 5 which are connected by a rod or drag link 6 to secure a simultaneous movement of both spindles when steering the vehicle in a manner well understood. The rod or drag link 6 is mounted in bearings 7 secured to the side bars 1 to slide freely but prevented from turning. Opposite ends of the connecting rod 6 are of angular formation in cross section and are received in openings of corresponding outline formed in the bearings 7. An intermediate portion of the rod 6 is of circular outline and threaded as indicated at 8. A short section 9 is threaded to an end of the rod 6 and admits of adjusting said rod to aline the steering wheels in a manner well understood. It is necessary to provide for the relative vertical movement of the connecting rod 6 and also to allow for the connecting means between said rod and the spindles 4 to prevent any binding. This is accomplished by pivotally connecting shackle arms 10 to the ends of the rod and pivotally and slidably connecting the shackle arms 10 to the arms 5. The arms 5 comprise companion members transversely spaced to receive the arms 10 therebetween. A pin 11 at the outer or forward end of each of the arms 10 engages slots 12 in the members comprising the arms 5. In this manner, the arms 10 have both a pivotal and sliding connection with the arms 5, whereby to adapt themselves to varying distances in the connections between the wheel spindles 4 and the outer ends of the connecting rod 6. Cross heads 13 are formed upon the rear ends of the members comprising the arms 5 to engage the sides of the arms 10 at any adjusted position incident to the vertical movement of the connecting rod 6, as will be readily appreciated.

A housing 14 is mounted upon the chassis and is rigidly connected to a cross bar 15 bolted or otherwise secured to the side bars 1. The housing 14 encloses gearing forming connecting means between the steering shaft 16 and the connecting rod 6. This gearing includes a large spur gear 17 which is fast to the lower end of the steering shaft 16. The spur gear 17 is in mesh with the pinion 18 of a compound gear including a bevel gear 19. A bevel gear nut 20 is mounted upon the threaded portion 8 of the connecting rod 6 and is in mesh with the bevel gear 19. The gear 20 is free to rotate but is prevented from moving longitudinally, hence rotation of the gear nut effects a longitudinal movement of the connecting rod 6, whereby steering is effected through pivotal movement of the spindles 4 in a manner well understood. A housing 21 encloses that portion of the connecting rod 6 between the gear housing 14 and bearing 7, as indicated most clearly in Figures 1 and 4 of the drawings.

The pivotal connection of the arms 10 with the connecting rod 6 and the pivotal and sliding connection of said arms with the arms 5 provide for accommodation of the connections between the spindle 4 and connecting rod when the machine is in operation. To steer the vehicle, the shaft 16 is rotated in the accustomed manner and through the gearing, imparts a longitudinal movement to the connecting rod 6, which is transmitted to the wheel spindles 4 by the adjustable connections 5 and 10. The arrangement precludes accidental movement of the steering wheels from a given position by impact of either one of the steering wheels with an object, or the dropping thereof into a rut or depression. Moreover, the construction prevents vibration or shock being transmitted to the operator. The ease with which access may be had to the gearing provides for ready replacement and repairs when necessary, at a small cost.

The arms 10 are pivoted to studs 22 which are connected to the ends of the drag link 6 by a swivel joint, thereby precluding any binding action of the pivots incident to the vertical movements of the drag link 6 when the vehicle is traveling over rough roads.

What is claimed is:

1. In a steering mechanism for vehicles, the combination with a drag link and pivoted wheel spindles, of a pair of spaced arms rigidly connected to each spindle, shackle arms each pivoted to swing about a vertical axis on a corresponding end of the drag link, said shackle arms being each pivoted to swing about a horizontal axis between a corresponding pair of said spaced arms, and arcuate cross heads disposed in vertical planes on the spaced arms for directing pivotal movement of the shackle arms between the spaced arms.

2. In a steering mechanism for vehicles, the combination with a drag link and pivoted wheel spindles, of a pair of rearwardly extending parallel arms rigidly connected to each spindle, shackle arms pivoted to the ends of the drag link and received between said parallel arms, horizontal pivot pins slidably fitted in longitudinal slots in said parallel arms, the shackle arms being terminally pivoted to rock vertically on said pivot pins, and arcuate cross heads disposed in vertical planes on the ends of the parallel arms for directing the pivotal and sliding movement of said shackle arms between said parallel arms.

In testimony whereof I affix my signature.

WALFRID JOHNSON. [L. S.]